Jan. 29, 1924.
C. MACMILLAN
ELECTRIC POWER SYSTEM
Filed March 10, 1923
1,481,848
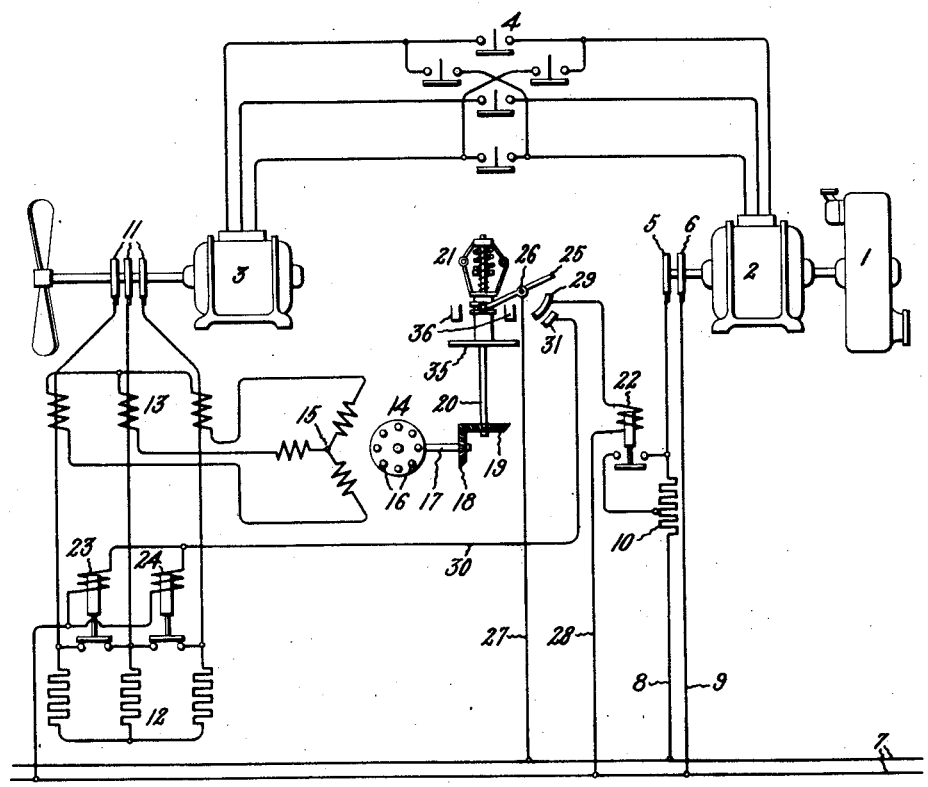
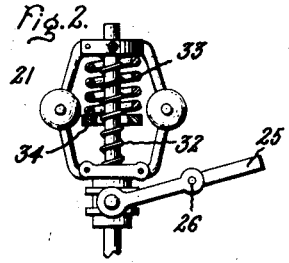
Inventor:
Campbell Macmillan Patented Jan. 29, 1924.

1,481,848

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

ELECTRIC POWER SYSTEM.

Application filed March 10, 1923. Serial No. 624,246.

*To all whom it may concern:*

Be it known that I, CAMPBELL MACMILLAN, a citizen of the United States, residing at Schenectady, county of Schenectady, State of New York, have invented certain new and useful Improvements in Electric Power Systems, of which the following is a specification.

My invention relates to electric power systems and especially to systems of electric ship propulsion wherein one or more alternating current motors are arranged to drive the ship's propeller.

My invention is in some respects an improvement upon the system of ship propulsion disclosed in a copending application by David C. Prince, Serial No. 365,762, filed March 15, 1920 and assigned to the same assignee as the present application, but differs therefrom in that the system is controlled in response to the actual value of the motor slip instead of in response to departures from a predetermined slip frequency. As pointed out in the aforementioned application, it has been found that many of the operations required to be performed in connection with the operation of electrically driven ships may be controlled in response to the slip of the propeller motor. If the propeller is driven by an induction motor supplied with power from a synchronous generator or alternator, both the necessity for change in the motor secondary resistance and that of increased or decreased generator excitation is indicated by variation in the slip frequency of the motor. The maximum torque of the motor under given conditions takes place at a constant slip frequency and any percentage of its maximum torque corresponds to a definite and constant slip frequency. The highest operating efficiency of the system as a whole is realized when the minimum amount of excitation, consistent with sufficient torque on the motor, if supplied to the alternator and as long as the slip does not exceed a certain value in cycles per second the excitation may be reduced, but the limit of such a reduction is at once indicated by an increase in the slip frequency. All the operations mentioned may, therefore, be controlled by a device arranged to operate in response to variations in the slip frequency of the motor.

An object of my invention is to provide an improved means for enabling the various control operations necessary for operating and maneuvering an electrically propelled ship to be performed efficiently, with precision, and with certainty of result.

A further object of my invention is to provide means for automatically performing the various control operations in an electric ship propulsion system in accordance with the actual value of the slip frequency of the propeller motor.

A further object of my invention is to provide automatically operating control means for an electric ship propulsion system whereby the stability of operation may be increased and the efficiency of the system maintained at a high value.

Other objects and advantages will become apparent as my invention is considered in detail.

My invention will be better understood from the following description taken in connection with the accompanying drawing and its scope will be pointed out in the appended claims.

Referring now to the drawing, there is shown diagrammatically in Fig. 1 a system of ship propulsion in which my invention has been embodied, and in Fig. 2 certain details of a centrifugal governor arranged to be operated in accordance with the slip frequency of the motor.

Fig. 1 shows a steam turbine 1 arranged to drive a synchronous generator or alternator 2 which may be conductively connected to the propeller motor 3 through a reversing switch 4. The field winding of the alternator 2 is connected with a source of direct current 7 through slip rings 5 and 6 and leads 8 and 9. A resistor 10 is provided in the lead 8 for varying the excitation of the alternator 2. Connected to the secondary circuit of the motor 3 through the slip rings 11 is a resistor 12 provided for the purpose of varying the resistance of the motor secondary circuit. Also connected in the secondary circuit of the motor 3 is a three-phase series transformer 13 provided for supplying power to a pilot motor 14 which has a primary winding 15 and a squirrel cage secondary winding 16 having a resistance of such value as to limit the pilot motor speed so that the brake disk 35 will not be brought into contact with the members 36 at starting. To the shaft 17 of the motor 14 is fixed a bevel gear 18 which cooperates with a similar gear 19 to drive the shaft 20 and rotate the centrifugal governor 21. A relay 22 is provided for reducing the value of the resistance connected in series with the excitation circuit of the alternator 2 and similar relays 23 and 24 are provided for short-circuiting the resistor 12 in the secondary circuit of the motor 3. Operated by the governor 21 is a switch arm 25 pivoted at 26 and arranged to connect the relay 22 to the source of direct current 7 through leads 27 and 28 and contact 29. Upon further movement of the arm 25 the relays 23 and 24 are connected to the source 7 through leads 27 and 30 and contact 31. During the first part of its action the governor 21 operates the switch arm 25 to close the circuit of the relay 22 and is opposed by a comparatively weak spring 32. During the latter part of its action the governor 21 operates the arm 25 to close the circuit of relays 23 and 24 and is also opposed by a comparatively strong spring 33 which rests upon a movable member 34. A brake disk 35 is arranged to make frictional contact with the fixed member 36 for the purpose of preventing excessive speed of the pilot motor 14 upon reversal of the propeller motor 3 when the slip frequency is comparatively high.

In the operation of the system just described, steam is admitted to the turbine 1 to drive the generator 2, and the reversing switch 4 is closed to supply power to the propeller motor 3. At starting the slip frequency of the motor 3 is high, the pilot motor is driven at high rate of speed, the value of which is determined by the secondary resistance of the pilot motor 14, and the governor 21 operates the switch arm 25 to increase the excitation of the alternator 2 and to introduce the resistor 12 into the secondary circuit of the propeller motor 3 thereby increasing its driving torque. As the propeller motor 3 comes up to speed its slip frequency decreases and the speed of the pilot motor is reduced thereby opening the circuits of relays 23 and 24 to permit cutting out of the secondary resistors 12 and finally opening the circuit of the relay 22 to introduce additional resistance into the exciting circuit of the alternator.

During normal operation of the system, closure of the circuit of the relay 22 is prevented by the spring 32, but when the load on the motor 3 has increased to a predetermined value the governor is driven at a speed sufficiently high to overcome the force exerted by this spring and the circuit of the relay 22 is closed thereby increasing the excitation on the alternator 2. Should this prove insufficient to meet the increased torque, the slip frequency continues to increase, and the governor operates against the force exerted by the spring 33 to close the circuit of relays 23 and 24 thereby introducing the resistor 12 into the secondary circuit of the propeller motor and adapting it for operation at higher torque and higher slip. By the springs 32 and 33 the governor 21 is thus made responsive to two different ranges of slip frequency within the lower of which the excitation on the generator is increased and within the higher of which the secondary resistance of the propeller motor is increased.

During reversing operations when the slip frequency is highest, excessive speed of the pilot motor 14 is prevented by frictional contact between the fixed members 36 and the brake disk 35 which operates to pull the pilot motor out of synchronism. Under these conditions the centrifugal mechanism will continue to revolve at moderate speed until the slip returns to normal when the torque of the pilot motor will increase and bring it again into synchronism with the slip frequency.

While I have indicated the means for adjusting the generator excitation as comprising a single relay 22, it is obvious that my invention is not limited to controlling a single section of resistance since the excitation may be adjusted in a plurality of successive steps by providing additional relays and additional contacts 29 arranged to be engaged successively by the arm 25.

What I claim as new and desire to secure by Letters Patent of the United States, is:

1. An electric power system wherein an alternating current generator is arranged to supply power to a load motor adapted to operate with a plurality of torque characteristics, characterized by the fact that a centrifugally operated device is provided for controlling the torque characteristics of said motor in response to one predetermined value of motor slip frequency and for controlling the excitation of said generator in response to a different value of motor slip frequency.

2. A system of ship propulsion comprising an alternating current generator, a propeller motor arranged to be supplied with current from said generator, a pilot motor driven at a speed proportional to the slip frequency of said propeller motor, and a centrifugal device responsive to a predetermined speed of said pilot motor for controlling the excitation of said generator.

3. A system of ship propulsion comprising an alternating current generator, a propeller motor arranged to be supplied with current from said generator, a pilot motor driven at a speed proportional to the slip frequency of said propeller motor, and a centrifugal device responsive to one predetermined speed of said pilot motor to control the excitation of said generator and responsive to a different predetermined speed of said pilot motor to control the propeller motor secondary resistance.

4. A system of ship propulsion comprising an alternating current generator, a propeller motor arranged to be supplied with current from said generator, a series transformer in the secondary circuit of said propeller motor, a pilot motor arranged to be supplied with current from said transformer, and a centrifugal device responsive to one predetermined speed of said pilot to control the excitation of said generator and responsive to a different predetermined speed of said pilot motor to control the secondary resistance of said propeller motor.

5. A system of ship propulsion comprising an alternating current generator, a propeller motor arranged to be supplied with current from said generator, and a centrifugal device responsive to one value of propeller motor slip frequency to increase the excitation of said generator and responsive to one value of propeller motor slip frequency to increase the excitation of said generator and responsive to a higher value of slip frequency to increase the secondary resistance of said motor.

6. An electric power system wherein an alternating current generator is arranged to supply power to a reversible load motor adapted to operate with a plurality of torque characteristics, comprising a centrifugally operated device for controlling the torque characteristics of said motor in response to one predetermined value of motor slip frequency and for controlling the excitation of said generator in response to a different value of slip frequency, and means for maintaining the speed of said centrifugal device below a predetermined value upon the reversal of said load motor.

In witness whereof, I have hereunto set my hand this 9th day of March, 1923.

CAMPBELL MACMILLAN.